S. FARMAN.
COTTON CHOPPER.
APPLICATION FILED OCT. 17, 1908.
915,167.
Patented Mar. 16, 1909.
2 SHEETS—SHEET 1.
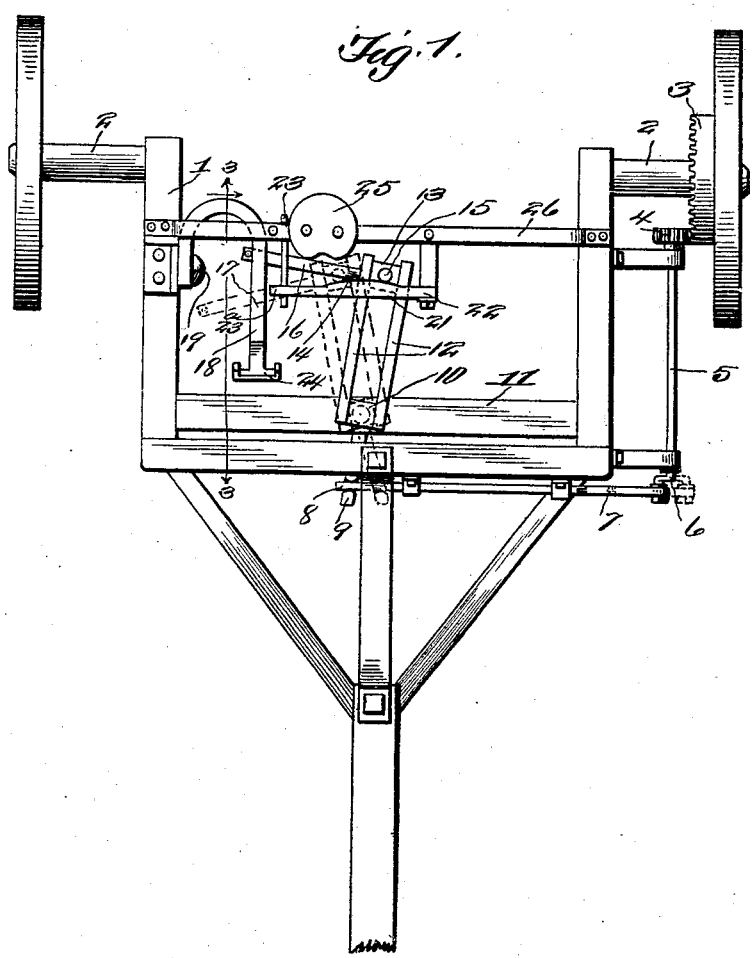
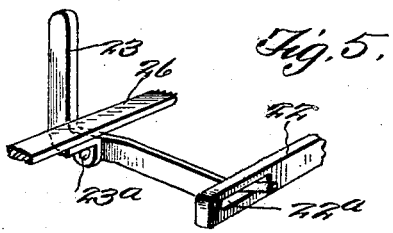

S. FARMAN.
COTTON CHOPPER.
APPLICATION FILED OCT. 17, 1908.
915,167.
Patented Mar. 16, 1909.
2 SHEETS—SHEET 2.
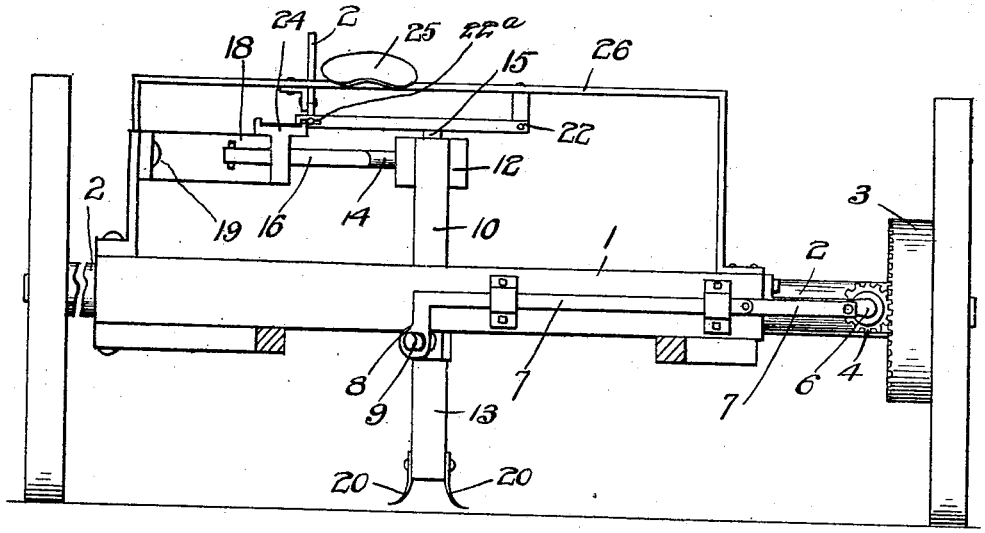
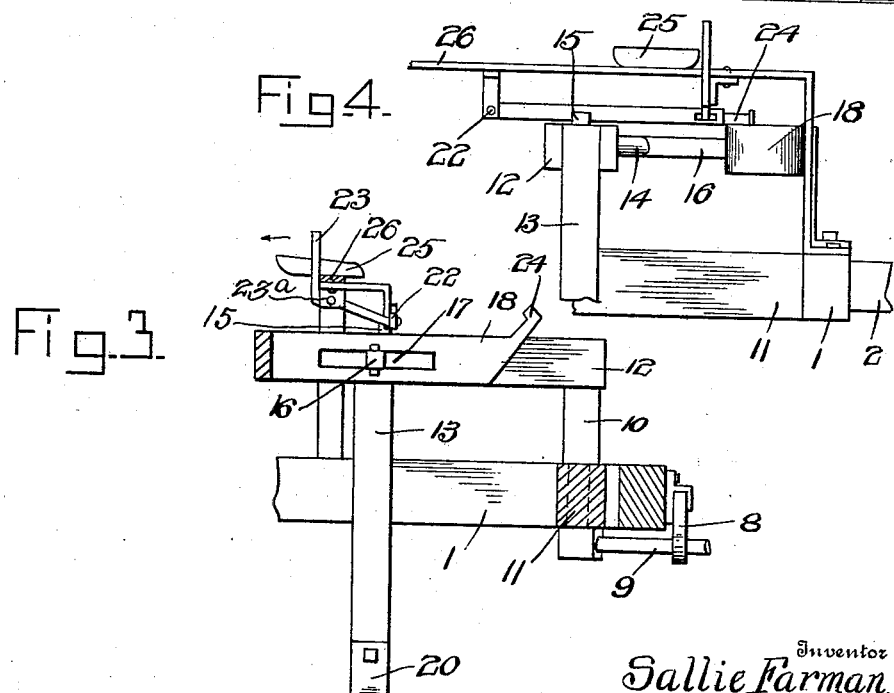

UNITED STATES PATENT OFFICE.

SALLIE FARMAN, OF TYRONZA, ARKANSAS.

COTTON-CHOPPER.

No. 915,167.  Specification of Letters Patent.  Patented March 16, 1909.

Application filed October 17, 1908. Serial No. 458,256.

*To all whom it may concern:*

Be it known that I, SALLIE FARMAN, a citizen of the United States, residing at Tyronza, in the county of Poinsett and State of Arkansas, have invented a new and useful Cotton-Chopper; and I do hereby declare the following to be a full, clear, and exact description of the invention, such as will enable others skilled in the art to which it appertains to make and use the same.

The invention relates to a cotton chopper and has for its object to provide a simple, inexpensive and durable device of this character adapted to be driven along a row of cotton.

Another object of the invention is to provide a device of this character having a knife mounted in an oscillatory frame.

With these and other objects in view, the invention consists in the novel construction and arrangement of parts hereinafter described and shown and particularly pointed out in the appended claims.

In the drawings, Figure 1 is a plan view of a cotton chopper constructed in accordance with this invention, showing the frame 12 in dotted positions, which illustrates the lateral oscillation of said frame and the throw of the same. Fig. 2 is a front elevation of the same. Fig. 3 is a sectional view taken on line 3—3 of Fig. 1. Fig. 4 is a rear view of the oscillating frame. Fig. 5 is a detail perspective view of the lever 23 and the member 22, showing the connections therebetween, and also showing the beam 26.

Referring to the drawings, 1 designates a frame which is provided with stub axles 2 on which the wheels are mounted for transporting the device. One of the wheels is rigidly connected with a gear wheel 3 which meshes with a pinion 4 to which is connected a revolving shaft 5. The shaft 5 is provided with a crank 6 which is pivotally connected with a pitman 7 which pitman 7 is provided with an L-shaped portion 8. The crank 6 imparts an oscillatory motion to a horizontal member 9 which member 9 is rigidly connected with a vertical member 10 at the lower portion thereof. The vertical member 10 is provided with a reduced cylindrical portion, as shown in dotted lines in Fig. 3, which cylindrical portion has a bearing in a cross beam 11, which is rigidly connected with a frame 12, so as to allow the said frame 12 to oscillate laterally. The rear portion of the frame 12 is provided with a vertical standard 13 which is pivotally mounted in said frame on a pivot pin 14. The upper end of the standard 13 is provided with a knob 15. The pivot pin 14 is provided with an extension 16 which is mounted in a slot 17 of a lever 18. The lever 18 is pivotally connected with one side of the frame as shown at 19. The lower portion of the standard 13 is provided with a pair of knives 20 which, as the machine is driven along, are oscillated laterally because of the same being carried by the frame 12. In order to prevent the standard 13 from being swung on its pivot pin 14, toward the rear of the machine, a locking member 21 is provided which is pivotally connected to a support as shown at 22. When it is desired to disengage the knives, the L-shaped lever 23 is swung upon its pivot 23$^a$, in the direction of the arrow, as shown in the drawings, which raises the member 22 thereby releasing the knob 15 which leaves the knife carrying standard free to move. The horizontal arm of the lever 23 is mounted in an elongated slot 22$^a$ of the member 22, and in which slot the said arm has a slight movement, that is to say, in the raising and lowering of the member 22. The knife carrying standard 13 can then be swung rearwardly upon its pivot pin 14 by pressing the pedal 24 which is connected with the member 18.

The preferred form of my invention is herein shown and described but I reserve the right to make changes in the form, proportion and minor details of construction within the scope of the appended claims.

A seat 25 is provided for the device which is mounted on a frame 26.

What is claimed is:

1. A device of the class described, having a main frame an oscillatory frame, a vertical standard pivotally connected with said oscillatory frame, knives mounted on said vertical standard, means for actuating said oscillatory standard, and a pedal operated lever adapted to throw said vertical standard rearward when desired.

2. A device of the class described, comprising a main frame, an oscillatory frame mounted on said main frame, means for imparting motion to said oscillatory frame, a vertical standard pivotally connected with said oscillatory frame, knives carried by said standard, and means for throwing said standard rearward.

3. In a cotton chopper, a main frame, traction wheels therefor, a lateral oscillating frame, means operated by one of the traction wheels for oscillating said lateral oscillating frame, a pivoted knife carrying standard carried by said oscillating frame and provided with a knob, the pivot of said standard having an extension rectangular in cross section, a U-shaped lever pivoted to the main frame and provided with an opening to engage said rectangular extension for swinging the knife carrying standard rearwardly upon its pivot, an angle lever, means to engage said knob to prevent the standard from being swung upon its pivot, and manipulated by said angle lever for releasing the standard.

4. In a cotton chopper, a main frame, traction wheels therefor, a lateral oscillating frame, means operated by one of the traction wheels for oscillating said lateral oscillating frame, a pivoted knife carrying standard carried by said oscillating frame, the pivot of said standard having an extension rectangular in cross section, a U-shaped lever pivoted to the main frame and provided with an opening to be engaged by said rectangular extension for swinging the knife carrying standard rearwardly upon its pivot.

5. In a cotton chopper, a main frame, traction wheels therefor, a lateral oscillating frame, means operated by one of the traction wheels for oscillating said lateral oscillating frame, a pivoted knife carrying standard carried by said oscillating frame, the pivot of said standard having an extension rectangular in cross section, a U-shaped lever pivoted to the main frame and provided with an opening to be engaged by said rectangular extension for swinging the knife carrying standard rearwardly upon its pivot, and locking mechanism for preventing the manipulation of the knife carrying standard.

In testimony whereof I have signed my name to this specification in the presence of two subscribing witnesses.

SALLIE FARMAN.

Witnesses:
W. A. BEASLY,
H. C. OVERTURF.